United States Patent Office 3,353,630
Patented Nov. 21, 1967

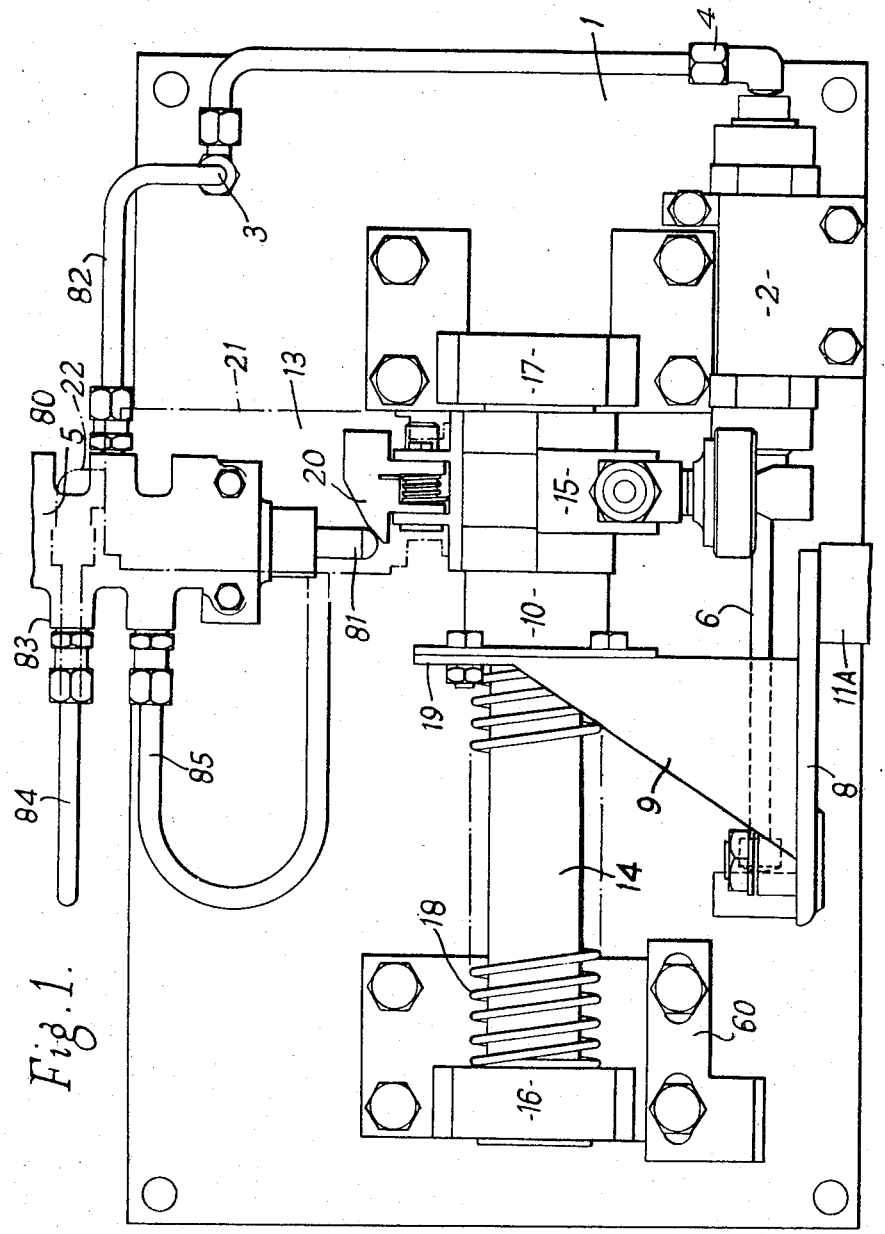

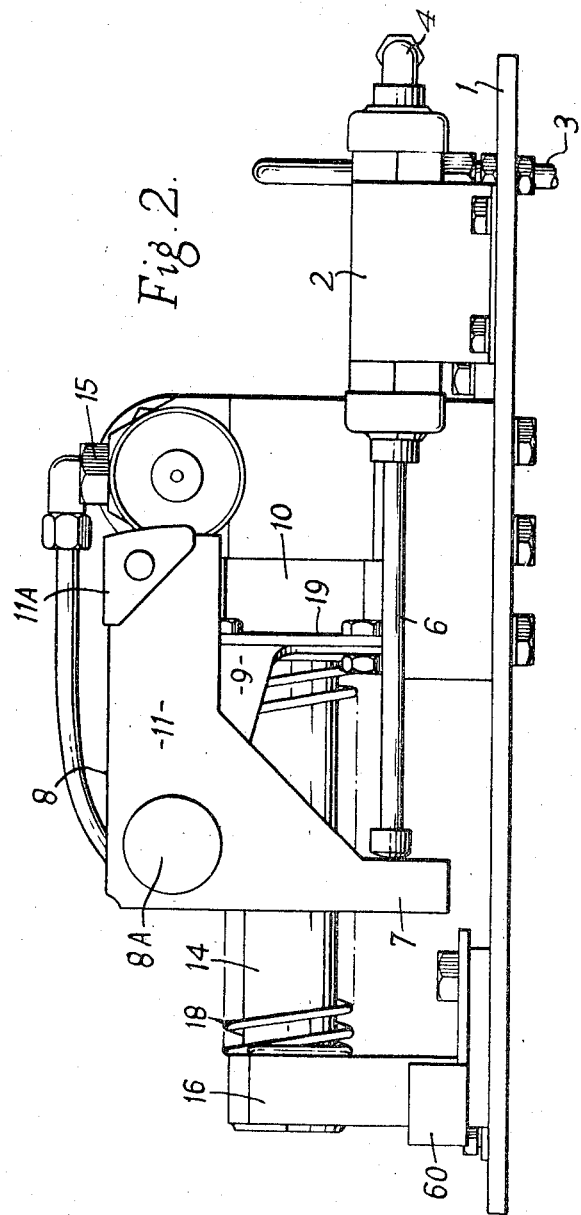

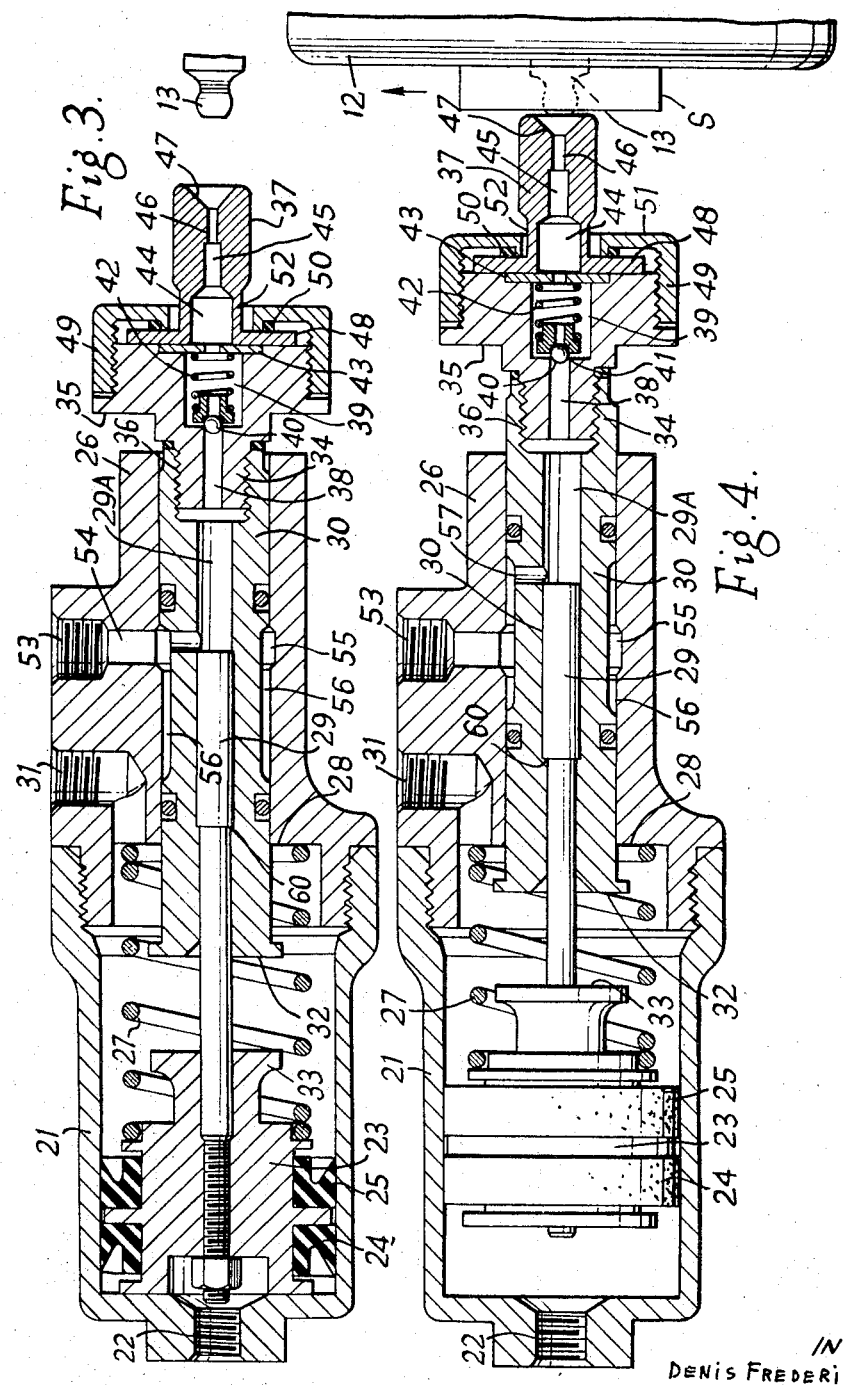

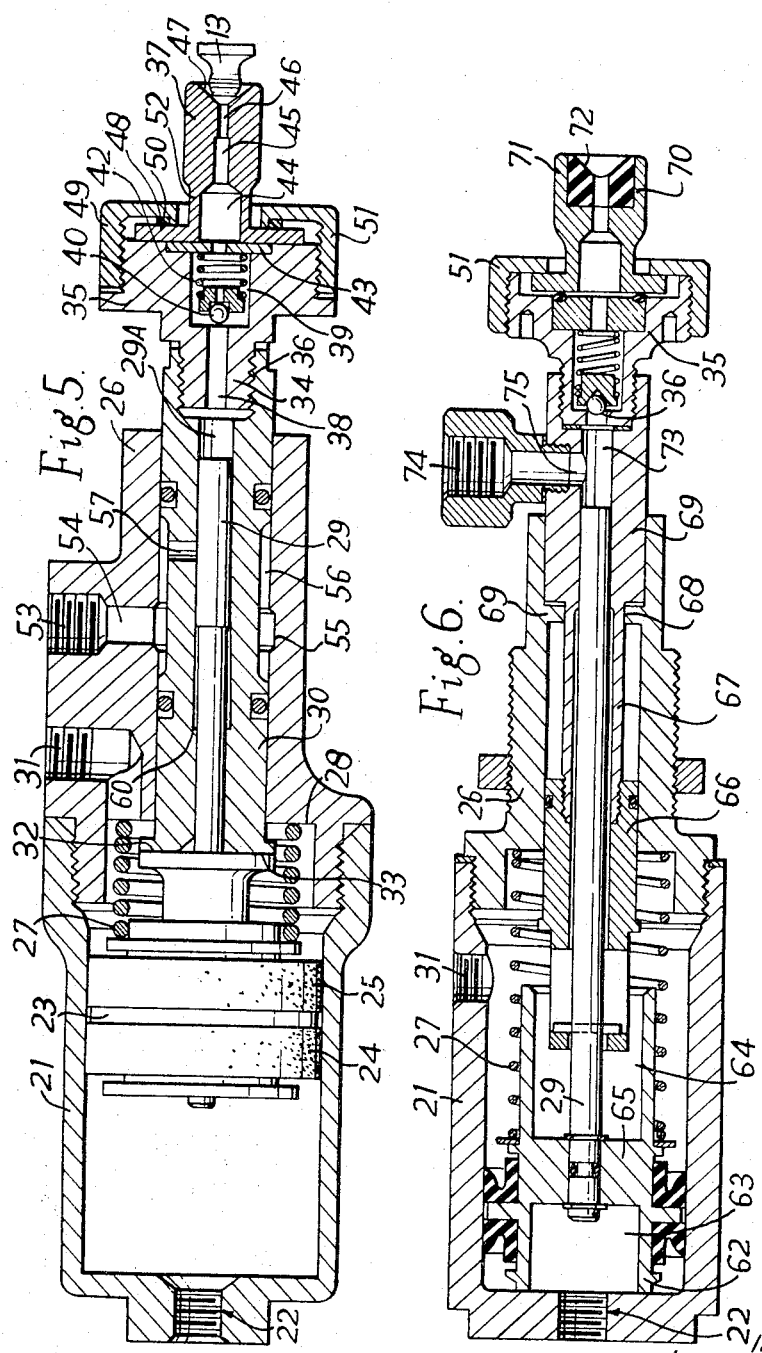

3,353,630
AUTOMATIC LUBRICATING APPARATUS
Denis Frederick Woor, Derriford, Plymouth, Devon, and Charles E. Higham, Brownhill, Plymouth, Devon, England, assignors to Tecalemit (Engineering) Limited
Filed May 28, 1965, Ser. No. 459,726
Claims priority, application Great Britain, May 29, 1964, 22,386/64
10 Claims. (Cl. 184—2)

ABSTRACT OF THE DISCLOSURE

A lubricating device is provided for automatically lubricating the bearings of the rollers of vehicles and includes a lubricating gun mounted on a carriage slidable parallel to the path of movement of the bearing. The lubricating gun has a lubricant ejecting nozzle movable transversely to the gun to engage lubricant points on the moving vehicle. A piston actuated plunger is effective to eject lubricant from the gun into the lubricant point.

---

The present invention relates to an automatic lubricating apparatus for use in lubricating the bearings of the rollers or wheels of vehicles of the type in which lubricant is injected periodically into lubrication points or nipples which are usually attached to the outer ends of the spindles or axles of such vehicles, such lubrication being effected while the vehicle is in motion. The invention is particularly applicable for use in the automatic lubrication of the bearings of the rollers of conveyors of the known chain link type and for convenience the vehicles to which the invention is applicable will be referred to hereinafter as "chain conveyors" or more simply as "conveyors."

Apparatus for lubricating the roller bearings of chain conveyors while the latter are in motion are known but to the best of our knowledge they all suffer from the disadvantage that they are not capable of use with a conveyor traveling at a high speed.

The main object of the invention is to overcome this disadvantage by providing a lubricating apparatus which, while capable of use at low speed, can also extend its range of operation so as to be able to dispense lubricant at a high rate, say up to 120 injections of lubricant per minute.

With the above object in view, according to the invention the lubricating apparatus comprises a mobile lubricating gun which is disposed transversely to the path of movement of the conveyor, movable trip means associated with the gun adapted to cooperate with abutments on the conveyor so that the gun will be carried along for a predetermined distance with and at the same speed as the conveyor, a fluid-actuated piston slidable in a barrel or cylinder forming part of the gun, lubricant-ejecting means carried by the piston for injecting lubricant from the gun into a nozzle member which forms part of the gun and is adapted to form a seal-tight connection with lubricant points or nipples on the moving conveyor, the said piston acting to move the said lubricant-ejecting means and the nozzle member towards and away from the lubricating point or nipple, means for controlling the flow of fluid to and from the gun barrel or cylinder to cause the fluid-actuated piston therein to move towards the lubricant point or nipple and the nozzle to make sealing contact with the lubricant point or nipple, the said fluid-controlling means also acting to bring about the return movement of the piston and the disengagement of the nozzle from its sealing contact with the lubricant point or nipple, and means associated with the gun for controlling the operation of the said means for controlling the flow of fluid to and from the gun barrel or cylinder.

The lubricating gun may be mounted on a carriage which is slidable in a direction parallel to the path of movement of the conveyor and which carries the said trip means and the means for controlling the flow of fluid to and from the gun barrel or cylinder.

The said means for controlling the flow of fluid to and from the gun barrel or cylinder may include a change-over valve, the operation of which is controlled by an abutment movably mounted on the carriage and acting to control the movement of the valve member so that the latter will allow pressure fluid to be admitted to the gun barrel or cylinder to cause the said piston and the said lubricant-ejecting means to move towards the conveyor and the nozzle member to form sealing-tight contact with a lubricant point or nipple, and to retract the lubricant-ejecting means and the nozzle after the lubricant has been injected into the lubricant point or nipple. The said movable abutment my consist of a spring-urged profiled cam which is pivotally mounted on the carriage and which cooperates with and moves the said valve member to cause the latter to feed pressure fluid to one side or the other of the piston in the gun barrel or cylinder.

The said trip means may consist of a trip plate which is pivotally mounted on the carriage and which is retained in a position in which it is held in the path of the abutments on the conveyor by fluid-actuating means, the action of which may be controlled by the said change-over valve.

The said lubricant-ejecting means preferably consist of a plunger which is rigidly connected with the fluid-actuated piston in the gun barrel cylinder, and is slidable in a cylinder which is itself slidable in the gun barrel or cylinder.

In a constructional form of the invention which is described hereinafter, the fluid-actuated piston in the gun barrel or cylinder is spring-urged in a direction towards a fluid inlet provided in the end of the gun barrel or cylinder remote from the vehicle rollers or wheels and in the same construction the lubricant is supplied to the bore in which the cylinder of the plunger is slidable through a port, the opening and closing of which is controlled by the plunger.

The lubricating gun is provided with a nozzle which is in communication with the bore of the plunger cylinder and the flow of lubricant through which is controlled by a non-return valve. It is preferred to use a floating nozzle carried by a nozzle-carrier comprising means which acts to permit the nozzle to accommodate mis-alignment of the lubricant points or nipples relative to the axis of the nozzle.

Embodiments of the invention are shown, by way of example, in the accompanying drawings, wherein:
FIGURE 1 is a plan view of one embodiment;
FIGURE 2 is a side view;
FIGURE 3 is a sectional view of the lubricating gun in which the gun nozzle is fully retracted from the nipple on a roller spindle of a conveyor roller;
FIGURE 4 is a sectional view of the gun in which the nozzle is moving toward the nipple;
FIGURE 5 is a sectional view of the gun in which the nozzle is in sealing engagement with the nipple;

FIGURE 6 is a sectional view of a modified lubricant gun.

Referring first to FIGURES 1 to 5:

The embodiment of the invention shown in these figures is applied to a chain link conveyor lubricating apparatus which is described hereinafter as an example of one method of carrying out the invention to supply lubricant to the conveyor roller spindles and thence to the roller bearings.

This apparatus comprises a base plate 1 which is fixed on one side of the conveyor (one of the roller spindles S of which is shown in FIG. 4) with its axis parallel to the direction of movement of the conveyor, such direction being indicated by the arrow in FIG. 4 a trip plate actuating-air-cylinder 2 is fixed on and near to the edge of the base plate 1 adjacent to the conveyor and comprises an air inlet (FIGURES 1 and 2) connected to a source of compressed air (not shown) and an outlet 4 connected to a known type of pneumatic change-over valve 5. A piston is slidable in the cylinder 2 and carries a piston rod 6, the outer end of which is adapted to engage a downwardly-depending arm 7 on a bell crank-like trip plate 8 which is pivotally mounted on a bracket 9 fixed to a carriage 10 slidably mounted on the base plate, the pivot 8A of the trip plate 8 being at right angles to the line of movement of the conveyor. The trip plate also comprises a horizontal arm 11 provided at its free end remote from the pivot 8A with a stub or pad 11A which, when the lubricating apparatus is in its operative position and the rod 6 of the piston in the above mentioned air-cylinder 2 is bearing against the vertical arm 7 of the trip plate 8, projects into the path of movement of the conveyor rollers 12 or abutments carrying the lubrication points or nipples 13 which are to receive the lubricant. The carriage 10 is slidably mounted for movement parallel to the line of movement of the conveyor on a longitudinal carriage support 14.

A lubricating gun 15, particulars of which are described hereinafter, is also carried by the carriage with its axis at right angles to the line of movement of the conveyor. By the movement of the conveyor rollers or abutments, the carriage 10 and thus the trip plate 8 are carried along with the conveyor when the said stub 11A on the horizontal arm 11 of the trip plate is engaged by a roller or abutment. As mentioned above, the carriage is slidably guided on a carriage support 14 mounted in spaced brackets 16 and 17 fixed to the base plate and is constantly acted upon by a recoil spring 18 which reacts between the bracket 16 and an abutment 19 on the carriage.

A spring-urged profiled cam 20 is pivotally attached to the carriage on the side of the latter remote from the trip plate 8 and serves, in a manner described hereinafter, to actuate the valve member of the pneumatic change-over valve 5 which controls the flow of compressed air to and from the lubricating gun and the said trip plate actuating cylinder 2 mounted on the base plate. As shown in FIGURES 3 to 5 the lubricating gun comprises a stepped barrel or cylinder 21, the axis of which is at right angles to the line of movement of the conveyor. The end of the barrel remote from the conveyor is closed, but is provided with an air inlet port 22 which is connected to the said change-over valve 5. A piston 23 is slidably arranged in the barrel and is fitted with sealing rings 24 and 25, the outer peripheries of which slide in sealing contact with the bore of the barrel 21. A tubular barrel extension 26 is attached to the opposite end of the barrel and a spring 27, which reacts between a shoulder 28 in the extension and an abutment on the piston, tends constantly to press the piston towards the air inlet port 22 in the closed end of the barrel 21.

One end of a lubricant-dispensing plunger 29 is attached to the piston 23, the plunger projecting away from the closed end of the barrel and being slidable in the bore 29A of a cylinder 30 which is slidably guided in the bore of the barrel extension 26 adjacent to the end of the barrel to which the barrel extension is attached. Adjacent to the junction of the barrel 21 and barrel extension 26 the barrel extension is formed with a return air inlet port 31 which is connected to the said air change-over valve. The inner end of the plunger cylinder 30 is formed with a shoulder 32 which in conditions referred to hereinafter is abutted by a shoulder 33 provided on the adjacent end of the piston 23. The shank 34 of the body 35 of a nozzle-carrier is screw threaded and is screwed into a threaded hole 36 formed in the outer end of the cylinder 30. A floating nozzle 37 is carried on the nozzle carrier and is self-aligning to accommodate misalignment of lubricating points relative to the axis of the nozzle. The nozzle carrier is formed with an axial bore 38 which is coaxial with a bore 39 of greater diameter. A non-return ball valve 40 cooperates with a valve seat 41 formed at the junction of the bores 38 and 39 and is normally retained in its seated position by a spring 42 which reacts at one end against the ball and at its other end against an apertured washer 43 held in a recess formed in the outer end of the nozzle-carrier body 35. The nozzle 37 is hollow and comprises a large bore 44, an intermediate bore 45 and a small bore 46, the outer end of which latter communicates with a cup-shaped recess 47 which forms a lubricant-tight seal with the lubricant points or nipples 13 of the roller spindles S. The nozzle is formed with a flange 48 which is held in sealing contact with the washer 43 and the face of the nozzle carrier body 35 by a cap 49 which is screwed on to the nozzle-carrier body, a sealing ring 50 being arranged between the flange 48 and the inner surface of the end 51 of the cap. The head of the nozzle 47 is spaced from the flange 48 by a neck 52 which is accommodated in a hole formed in the end wall of the cap.

In order to bring the lubricating apparatus into operation, compressed air is admitted to the said trip plate actuating cylinder 2, whereupon the free end of the piston rod 6 of the piston in the cylinder is forced into engagement with the said vertical arm 7 of the trip plate 8 and holds the arm in a position in which the stub 11A on the horizontal arm 11 of the trip plate is in a position to engage a roller spindle S or an abutment on the conveyor. Since the carriage is entrained with the movement of the roller or abutment, the carriage moves along its own supporting slide 14 at the same speed as the conveyor and compresses the recoil spring 18.

Following the initial movement of the carriage (which movement may be predetermined), the said pivoted profiled cam 20 operates the valve member of the pneumatic changeover valve 5 which then allows air to be fed into the barrel 21 of the lubricating gun through the said inlet port 22 in the closed end of the barrel, whereupon, as shown in FIGURES 4 and 5, the piston 23 in the barrel, the plunger 29 attached to the piston 33, the plunger cylinder 30, and the nozzle member 37 are all forced in the direction of the conveyor until, as shown in FIGURE 5, the nozzle is engaged in sealing-tight manner with the lubricating point or nipple 13 on the roller spindle.

Grease under pressure is fed into the bore of the cylinder barrel 30 through a grease inlet 53 formed in the barrel extension 26 and in constant communication with a port 54 and an annular recess 55 in the extension 26 and a longitudinal recess 56 in the cylinder 30. A port 57 connects the recess 56 with the bore 29A of the cylinder 30.

Continued feed of pressure air into the barrel 21 of the lubricating gun then causes the lubricant-dispensing plunger 29 to close the port 57 and force lubricant under pressure. The lubricant is then forced past the non-return valve 40 in the nozzle-carrier body 35 and thence is injected out of the nozzle through the bores 44, 45 and 46 into the point or nipple 13 which is to receive the lubricant.

Further movement of the carriage in the same direction causes the valve member of the pneumatic change-over valve 5 to be released from the spring-urged profiled cam 20 carried by the carriage 10, whereupon the change-over valve acts to allow pressure air to be supplied to the opposite side of the piston 23 in the barrel 21 of the lubricating gun, with the result that the gun nozzle is withdrawn rapidly from the lubricating point or nipple 13. Still further movement of the carriage causes the vertical arm 7 of the trip plate 8 to be engaged with an abutment stop 60 which is adjustably arranged on the base plate 1 and may be pre-set to suit any type of conveyor to which the apparatus may be applied. This engagement causes the trip plate 7 to turn about its pivot 8A and allow the conveyor roller S or abutment to be disengaged from the carriage assembly. This movement of the carriage 10 is effected by the said recoil spring 18 acting upon the carriage, which latter returns to its position of rest.

The piston rod 6 of the piston in the trip plate actuating-cylinder 2 is then moved to return the trip plate into its position of engagement in readiness for the next cycle of operation.

The relative movement of the plunger 29 in the lubricating gun is prevented by the residue of lubricant pressure within the plunger cylinder 30 until the nozzle abuts against the nipple or the lubricating point.

By means of the change-over valve 5, air is exhausted from the air inlet port 22 in the gun barrel 21 and is applied to the said return air inlet port 31. This causes the plunger cylinder 30 and the nozzle to retract since on its return or suction stroke the plunger strikes against a shoulder 60 in the bore 29A. Further movement retracts the piston 23, thus allowing the bore 29A to be re-charged with lubricant through the said lubricant inlet port 53, the port 54, the annular space 55 and the recess 56.

When it is not required to operate the lubricating apparatus the air supply is shut-off by the operator and the piston in the trip plate actuating cylinder 2 retracts and keeps the trip plate 8 in its pivoted position by means of stops (not shown) thereby allowing the conveyor rollers to pass without engaging the lubricating apparatus.

The barrel of the lubricating gun may comprise known means to provide free forward movement to accommodate itself to the transverse set clearances for the gun nozzle, which clearances are irrespective of manufacturing tolerances met with on the conveyor assembly itself.

Although in the lubricating apparatus which has been described above compressed air is used for the operation of the apparatus, it will be understood that other fluids or liquids may be used for the same purpose.

The modified gun shown in FIGURE 6 differs from that shown in FIGURES 3, 4 and 5 in that the air-actuated piston 62 comprises two bores 63 and 64 which are coaxial with the axis of the piston and are isolated from each other by a transverse partition 65 in the piston. The end of the plunger 29 is attached to the partition and is slidable partly in a cylinder 66 and partly in a cylinder extension 67 fixed to the cylinder. The extension is slidable in a hole 68 formed in a partition 69 in the bore of the barrel extension 26. On the side of the partition remote from the plunger cylinder 66, the extension 67 has an enlarged head 69 which extends out of the barrel extension 26 towards the conveyor. The head 37 of the nozzle is formed with a recess 70 to receive an apertured sealing member 71 provided with a cup-shaped sealing recess 72 for the nipples or points of the roller spindles. The operation of this modified gun is substantially the same as that shown in FIGURES 3 to 5, except that in the modified gun lubricant under pressure is supplied to the bore 73 of the cylinder extension 67 through an inlet 74 and a port 75, the opening and closing of which latter is controlled by the plunger 29.

Any suitable type of change-over air valve 5 may be used. Briefly, the valve comprises a stepped slide valve which, externally of the valve casing 80, comprises a push button 81 with which the pivoted cam 20 cooperates as mentioned above. The valve casing comprises an inlet port connected by a pipe 82 to the compressed air inlet 3, an exhaust port 83 which is connected by a pipe 84 to the inlet 22 in the gun barrel and another exhaust port which is connected by a pipe 85 to the port 31 in the gun barrel extension 26. These pots are opened and closed in known manner by the movements of the slide valve which movements are controlled by the pivoted cam 20 in cooperation with the push button 81.

We claim:

1. Lubricating apparatus for automatically lubricating the bearings of the rollers of vehicles, comprising a support, a carriage slidable on the support, a mobile fluid-actuated lubricating gun which is mounted on the carriage and is disposed transversely to the path of movement of the carriage, a spring-urged trip pivotally mounted on the carriage, a source of compressed fluid, a change-over valve connected to said source, said valve being actuated by said trip, said gun including a barrel, a piston slidable therein, a lubricant-injecting plunger carried by the piston for injecting lubricant from the gun into a nozzle which forms part of the gun and is adapted to engage lubricant points on the moving vehicle, the said piston acting to move the said lubricant ejecting plunger and the nozzle towards and away from the lubricating point, the flow of fluid to and from the gun barrel being controlled by said changeover valve, a trip plate pivotally mounted on the carriage, a trip plate cylinder, the flow of pressure fluid to said cylinder being controlled by said changeover valve, a piston slidable in said trip plate cylinder, a piston rod connected at one end to said piston, the opposite end of said rod engaging said trip plate, a pad on the trip plate which is displaceable from an inoperative position in which it is out of the path of said rollers into an operative position in which the pad lies in the path of said rollers and is entrained by the latter, such displacement being brought about by the forward slidable movement of the said piston in the trip cylinder.

2. Lubricating apparatus as claimed in claim 1, in which the lubricating gun is mounted on a carriage which is slidable in a direction parallel to the path of movement of the conveyor and which carries the said trip plate and means for controlling the flow of fluid to and from the gun barrel.

3. Lubricating apparatus as claimed in claim 1, in which said trip acts to control the movement of the valve so that the latter will allow pressure fluid to be admitted to the gun barriel or cylinder to cause the said piston and the said lubricant-ejecting means to move towards the conveyor and the nozzle member to engage a lubricant point, and to retract the lubricant-ejecting plunger and the nozzle after the lubricant has been injected into the lubricant point.

4. Lubricating apparatus as claimed in claim 3, in which the said movable trip consists of a spring-urged profiled cam which is pivotally mounted on the carriage and which cooperates with and moves the said valve to cause the latter to feed pressure fluid to one side or the other of the piston in the gun barrel.

5. Lubricating apparatus as claimed in claim 1, in which the said trip plate is retained in a position in which it is held in the path of the conveyor by the trip plate cylinder, the action of which may be controlled by the said changeover valve.

6. Lubricating apparatus as claimed in claim 1, in which the said lubricant ejecting plunger is rigidly connected with the piston in the gun barrel and is slidable in a cylinder which itself is slidable in the gun barrel.

7. Lubricating apparatus as claimed in claim 1, in which the piston in the gun barrel is spring-urged in a direction towards a fluid inlet povided in the end of the gun barrel remote from the vehicle rollers or wheels.

8. Lubricating apparatus as claimed in claim 7, in which lubricant is supplied to the bore in which the cylinder of the plunger is slidable through a port, the opening and closing of which is controlled by the plunger.

9. Lubricating apparatus as claimed in claim 8, in which the lubricating gun is provided with a nozzle which is in communication with the bore of the plunger cylinder and the flow of lubricant through which is controlled by a non-return valve.

10. Lubricating apparatus as claimed in claim 9, in which the nozzle is a floating nozzle carried by a nozzle-nozzle-carrier comprising means which acts to permit the nozzle to accommodate mis-alignment of the lubricant points or nipples relative to the axis of the nozzle.

References Cited

UNITED STATES PATENTS

| | | | |
|---|---|---|---|
| 2,594,039 | 4/1952 | Le Clair | 184—15 |
| 2,754,932 | 7/1956 | Clements | 184—15 |
| 2,848,068 | 8/1958 | Abbott et al. | 184—15 |
| 2,990,916 | 7/1961 | Hillard et al. | 184—15 |
| 3,017,955 | 1/1962 | Tassile | 184—15 |
| 3,171,510 | 3/1965 | Olsen et al. | 184—2 X |
| 3,205,973 | 9/1965 | Klatchko | 184—2 |

LAVERNE D. GEIGER, *Primary Examiner.*

H. S. BELL, *Assistant Examiner.*